(12) United States Patent
Ocal et al.

(10) Patent No.: US 11,170,303 B1
(45) Date of Patent: Nov. 9, 2021

(54) SYSTEMS AND METHODS FOR EVALUATING TEMPORAL DEPENDENCY TREES

(71) Applicants: Mustafa Ocal, Miami, FL (US); Mark Finlayson, North Bay Village, FL (US)

(72) Inventors: Mustafa Ocal, Miami, FL (US); Mark Finlayson, North Bay Village, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/160,606

(22) Filed: Jan. 28, 2021

(51) Int. Cl.
*G06N 5/00* (2006.01)
*G06N 20/00* (2019.01)

(52) U.S. Cl.
CPC ............. *G06N 5/003* (2013.01); *G06N 20/00* (2019.01)

(58) Field of Classification Search
CPC ................................ G06N 5/003; G06N 20/00
See application file for complete search history.

(56) References Cited

PUBLICATIONS

Kolomiyets, Oleksandr, Steven Bethard, and Marie Francine Moens. "Extracting narrative timelines as temporal dependency structures." Proceedings of the 50th Annual Meeting of the Association for Computational Linguistics (vol. 1: Long Papers). 2012. (Year: 2012).*

Zhang, Yuchen. Temporal Dependency Structure Modeling. Diss. Brandeis University, 2020. (Year: 2020).*
Zhang, Yuchen, and Nianwen Xue. "Neural ranking models for temporal dependency structure parsing." arXiv preprint arXiv: 1809.00370 (2018). (Year: 2018).*
Harutyunyan, Hovhannes A., Calin D. Morosan, and Yunzan Zhang. "Two tree-based algorithms for network spare capacity design. " Eighth International Conference on Parallel and Distributed Computing, Applications and Technologies (PDCAT 2007). IEEE, 2007. (Year: 2007).*
Verhagen, Marc. "Drawing timeml relations with tbox." Annotating, Extracting and Reasoning about Time and Events. Springer, Berlin, Heidelberg, 2007. 7-28. (Year: 2007).*
Papapetrou, Panagiotis, et al. "Discovering frequent arrangements of temporal intervals." Fifth IEEE International Conference on Data Mining (ICDM'05). IEEE, 2005. (Year: 2005).*
Kavuluru, Ramakanth, Anthony Rios, and Yuan Lu. "An empirical evaluation of supervised learning approaches in assigning diagnosis codes to electronic medical records." Artificial intelligence in medicine 65.2 (2015): 155-166. (Year: 2015).*
Mirza, Paramita. "Extracting temporal and causal relations between events." arXiv preprint arXiv: 1604.08120 (2016). (Year: 2016).*
Zhang, Y. and Xue, N. (2018). "Structured interpretation of temporal relations." arXiv, CoRR, abs/1808.07599.

* cited by examiner

*Primary Examiner* — Luis A Sitiriche
*Assistant Examiner* — Sehwan Kim
(74) *Attorney, Agent, or Firm* — Saliwanchik, Lloyd & Eisenschenk (57) ABSTRACT

Systems and methods for quantifying temporal indeterminacy of timelines are provided. Systems and methods can rely on solving temporal constraint problems to extract timelines and can calculate the temporal relation loss during timeline transformation and then identify the temporal indeterminate sections of extracted timelines from both timelines and temporal graphs to measure the total temporal information loss.

9 Claims, 7 Drawing Sheets

| TimeML Link Types | Abstracted Link Types |
|---|---|
| A BEFORE B<br>A IBEFORE B<br>B TERMINATES A | A BEFORE B |
| A AFTER B<br>A IAFTER B | A AFTER B |
| A BEGINS B<br>A BEGUN_BY B<br>A ENDS B<br>A ENDED_BY B<br>A SIMULTANEOUS B<br>A IDENTITY B<br>B INITIATES A<br>B CULMINATES A | A OVERLAPS$_{tdt}$ B |
| A INCLUDES B<br>A DURING_INV B<br>B CONTINUES A | A INCLUDES B |
| A IS_INCLUDED B<br>A DURING B<br>B REINITIATES A | B INCLUDES A |

FIG. 4

| Corpus Name | Texts | Words | Events | Times | Relations | Text Types |
|---|---|---|---|---|---|---|
| ProppLearner | 15 | 18,862 | 3,438 | 142 | 2,778 | Hero tales |
| N2 Corpus | 67 | 28,462 | 2,345 | 349 | 4,854 | Religious texts, Magazine |
| TimeBank | 183 | 68,555 | 7,935 | 1,414 | 8,242 | Broadcast news, Newswire, Biography |
| TDT Corpus | 235 | n/a | 15,783 | 1,298 | 17,081 | News reports, Fairytale stories |
| Total | 500 | 115,879+ | 29,501 | 3,203 | 32,955 | |

FIG. 5

| | |
|---|---|
| A BEFORE B | $(A^+ < B^-)$ |
| A AFTER B | $(B^+ < A^-)$ |
| A IBEFORE B | $(A^+ = B^-)$ |
| A IAFTER B | $(B^+ = A^-)$ |
| A BEGINS B | $(A^- = B^-) \wedge (A^+ < B^+)$ |
| A BEGUN_BY B | $(A^- = B^-) \wedge (B^+ < A^+)$ |
| A ENDS B | $(B^- < A^-) \wedge (A^+ = B^+)$ |
| A ENDED_BY B | $(A^- < B^-) \wedge (A^+ < B^+)$ |
| A DURING B | $(B^- < A^-) \wedge (A^+ < B^+)$ |
| A DURING_INV B | $(A^- < B^-) \wedge (B^+ < A^+)$ |
| A INCLUDES B | $(A^- < B^-) \wedge (B^+ < A^+)$ |
| A IS_INCLUDED B | $(B^- < A^-) \wedge (A^+ < B^+)$ |
| A SIMULTANEOUS B | $(A^- = B^-) \wedge (A^+ = B^+)$ |
| A IDENTITY B | $(A^- = B^-) \wedge (A^+ = B^+)$ |
| A INITIATES B | same as B BEGUN_BY A |
| A REINITIATES B | same as B IS_INCLUDED A |
| A TERMINATES B | same as B BEFORE A |
| A CULMINATES B | same as B ENDED_BY A |
| A CONTINUES B | same as B INCLUDES A |
| A OVERLAPS$_{iult}$ B | A (BEGINS ∨ BEGUN_BY ∨ IDENTITY ∨ ENDS ∨ ENDED_BY ∨ SIMULTANEOUS) B |

FIG. 6

| Corpus | # TimeML Links | # Links Omitted | % Omitted |
|---|---|---|---|
| PropplLearner | 3,900 | 24 | 0.6% |
| N2 Corpus | 3,273 | 98 | 3.0% |
| TimeBank | 5,058 | 166 | 3.3% |
| Total or Average | 12,231 | 288 | 2.4% |

FIG. 7

| Corpus | Avg. Len. of Main Timeline in Time Steps | | | | Avg. Len. of Main Timeline in Time Points | | | | Total # of Time Points / Corpus | | | | Avg. % ↓ in Timeline Len. in Time Steps | |
|---|---|---|---|---|---|---|---|---|---|---|---|---|---|---|
| | TimeML Graphs | Full | Abs. TDTs | TDTs | TimeML Graphs | Full | Abs. TDTs | TDTs | TimeML Graphs | Full | Abs. TDTs | TDTs | Full TDTs | Abs. TDTs |
| TDT Corpus | - | - | - | 67.2 | - | - | - | 72.6 | - | - | - | 17,081 | - | - |
| PropplLearner | 123.5 | 108.7 | 108.7 | - | 238.7 | 230.6 | 230.6 | - | 3,580 | 3,460 | 3,460 | - | 11.9% | 14.7% |
| N2 Corpus | 17.7 | 17.1 | 17.1 | - | 40.2 | 35.6 | 35.6 | - | 2,694 | 2,390 | 2,390 | - | 3.4% | 6.7% |
| TimeBank | 9.3 | 8.5 | 8.5 | - | 51.1 | 48.2 | 48.2 | - | 9,349 | 8,821 | 8,821 | - | 8.6% | 10.8% |
| | | | | | | | | | Total | 15,623 | 14,671 | 14,671 | | |

FIG. 8

| Corpus | Total # Ind. Time Points / Corpus | | | Total # of Ind. Sections / Corpus | | | Average # of Ind. Sections / Text | | | Avg. % of Time Steps in Timelines that are Ind. | | |
|---|---|---|---|---|---|---|---|---|---|---|---|---|
| | TimeML Full Graphs | TDTs | Abs. TDTs | TimeML Full Graphs | TDTs | Abs. TDTs | TimeML Full Graphs | TDTs | Abs. TDTs | TimeML Full Graphs | TDTs | Abs. TDTs |
| TDT Corpus | - | - | 11,444 | - | - | 10,081 | - | - | 42.9 | - | - | 63.7% |
| ProppLearner | 1,066 | 1,892 | 2,159 | 432 | 669 | 910 | 36.8 | 59.5 | 67.8 | 29.8% | 54.7% | 62.4% |
| N2 Corpus | 1,355 | 1,568 | 1,816 | 683 | 770 | 944 | 8.9 | 11.2 | 13.0 | 50.3% | 65.6% | 76.0% |
| TimeBank | 6,348 | 6,563 | 7,462 | 970 | 1,079 | 1,976 | 6.3 | 6.3 | 7.2 | 67.9% | 74.4% | 84.6% |
| Total | 8,769 | 10,023 | 11,437 | 2,085 | 2,518 | 3,830 | Weighted Avg. | | | 61.3% | 71.1% | 81.2% |

FIG. 9

SYSTEMS AND METHODS FOR EVALUATING TEMPORAL DEPENDENCY TREES

GOVERNMENT SUPPORT

This invention was made with government support under N00014-17-1-2983 awarded by the Office of Naval Research (ONR) and under FA8650-19-C-6017 awarded by Defense Advanced Research Projects Agency (DARPA). The government has certain rights in the invention.

BACKGROUND

Extracting a representation of the temporal information in a text is a useful yet challenging task within natural language processing. Representations of temporal information can facilitate question answering (Saquete et al., Splitting complex temporal questions for question answering systems, In Proceedings of the 42nd Annual Meeting on Association for Computational Linguistics (ACL 2004), pages 566-573, Barcelona, Spain), information extraction (Wu et al., CTEMP: A Chinese temporal parser for extracting and normalizing temporal information, In Proceedings of the 2nd International Joint Conference on Natural Language Processing: Full Papers, pages 694-706, 2005), and summarization (Liu et al, Tiara: Interactive, topic-based visual text summarization and analysis, ACM Transactions on Intelligent Systems & Technology, 3(2):25:1-25:28, 2012), among many other tasks.

Researchers have developed several formalisms for representing temporal information expressed in text, each with specific advantages and disadvantages. Temporal representation languages that allow the representation of temporal graphs, such as Allen's temporal algebra (Allen, Maintaining knowledge about temporal intervals, Communications of the ACM, 26(11):832-843, 1983) or the XML-based Temporal Markup Language (TimeML) (Sauri et al., TimeML annotation guidelines, version 1.2.1, 2006, catalog.ldc.upenn.edu/docs/LDC2006T08/timeml_annguide_1.2.1.pdf.), are the most flexible schemes for marking of events, temporal expressions, and temporal relations. Temporal graphs expressed in these languages can be used for inference or determining partial orders of events and times. Although some of these languages for temporal graphs are quite expressive, for example TimeML having 25 relation types, they have certain limitations. First, the generality of temporal graphs makes many operations on them computation-ally hard. Second, they are less than ideal for visualization purposes, as they are difficult for people to read and understand. Third, they only explicitly provide partial, local orderings of events.

Allen's interval algebra (or Allen's temporal algebra) was the first attempt to model temporal information in documents (Allen, 1983, supra.). It is a calculus for temporal reasoning that defines 13 relations between time intervals. These relations are BEFORE, MEETS, OVERLAPS, STARTS, DURING, and FINISHES, their inverses, and EQUALS. Allen's algebra is what is called a qualitative temporal framework (Bartak et al., An Introduction to Constraint-Based Temporal Reasoning, Morgan & Claypool Publishers, 2014). Allen's conception of temporal algebras has been extended to quantitative frameworks, such as Simple Temporal Problems (STPs), Temporal Constraint Satisfaction Problems (TCSPs), Disjunctive Temporal Problems (DTPs), and Temporal Networks with Alternatives (TNAs) (Bartak, 2014, supra.). Quantitative temporal frameworks allow precise reasoning about the metric temporal distances between time points. Whether qualitative or quantitative, the temporal graphs generated through Allen-like frameworks can be checked for consistency. Allen introduced a constraint propagation algorithm to do just that, using the composition table and a shortest path algorithm, although it was also shown by counterexample that the algorithm was necessarily incomplete (Allen, 1983, supra.). Later, it was shown that full consistency checking must be NP-complete (Vilain et al., Constraint propagation algorithms for temporal reasoning: A revised report, Readings in Qualitative Reasoning About Physical Systems, pages 373-381, Morgan Kaufmann, San Francisco, Calif., 1990).

Because of the utility of temporal frameworks for reasoning about time, and also the relevance of time to understanding natural language, these results have been attempted to be applied to text understanding. This requires annotation schemes that would allow a person or a machine to notate the events, time points, and temporal relations expressed in a text. With regard to expressions of time itself, including expressions of when something happened, how often something occurs, or how long something takes, a sequence of TIMEX annotation schemes has been developed (Setzer, Temporal Information in Newswire Articles: an Annotation Scheme and Corpus Study, Ph.D. thesis, University of Sheffield, 2001; Ferro et al., Tides temporal annotation guidelines, ver. 1.0.2., 2001, www.timeml.org/terps/readings/MTRAnnotationGuide_v1_02.pdf; Pustejovsky et al., TimeML: robust specification of event and temporal expressions in text. In Proceedings of the 5th International Workshop on Computational Semantics (IWCS-5), pages 1-11, Tilberg, The Netherlands, 2003) for annotating expressions such as at 4 a.m. (when), every 3 weeks (how often), or for 2 hours (how long). Because events are also involved in temporal relations, these approaches developed into schemes for capturing events as well. For example, the Translingual Information Detection, Extraction, and Summarization (TIDES) (Ferro et al., 2001, supra.) is an XML-based annotation scheme that integrates TIMEX2 expressions, events, and six types of temporal relations.

Temporal Dependency Trees (TDTs) are an alternative to full temporal graphs for representing the temporal structure of texts, with a key advantage being that TDTs can be computed in a straightforward manner using adapted dependency parsers (Cheng et al., NAIST.Japan: Temporal relation identification using dependency parsed tree. In Proceedings of the 4th International Workshop on Semantic Evaluations (SemEval 2007), pages 245-248, Prague, Czech Republic). TDTs are a more computationally efficient representation where all events are arranged in a tree using only three temporal relation types: BEFORE; AFTER; and OVERLAPS. TDTs have been further improved with more precise definitions and increased expressivity (Kolomiyets et al., Extracting narrative timelines as temporal dependency structures, In Proceedings of the 50th Annual Meeting of the Association for Computational Linguistics (ACL 2012), pages 88-97, Jeju Island, Korea; and Zhang et al., Neural ranking models for temporal dependency structure parsing. arXiv, CoRR, abs/1809.00370, 2018). TDTs have the advantage that they can be easily computed using adapted dependency parsers, and extracting timelines from TDTs is much easier than from temporal graphs.

Nevertheless, it is intuitive that TDTs should suffer from temporal information loss relative to temporal graphs. TDTs are restricted to a tree form, and so certain temporal relationships that can be expressed in a graph cannot be expressed in the tree (e.g., cycles). Further, all TDT approaches restrict the types of temporal relationships, eliminating even more information. These omissions and restrictions should intuitively result in more indeterminacy in the global ordering of times and events.

BRIEF SUMMARY

Embodiments of the subject invention provide novel and advantageous systems and methods for quantifying temporal indeterminacy of timelines (e.g., the global ordering of temporal graphs and/or Temporal Dependency Trees (TDTs)). Systems and methods can rely on solving temporal constraint problems to extract timelines. Systems and methods of embodiments of the subject invention can calculate the temporal relation loss during TDT transformation and then identify the temporal indeterminate sections of extracted timelines from both TDTs and temporal graphs to measure the total temporal information loss.

In an embodiment, a system for providing quantifying temporal indeterminacy of a timeline can comprise: a processor; a memory in operable communication with the processor; and a machine-readable medium in operable communication with the processor and the memory, the machine-readable medium having instructions stored thereon that, when executed by the processor, perform the following steps: generating at least one TDT by transforming at least one temporal graph of a corpus to the at least one TDT, the at least one temporal graph being stored on at least one of the memory and the machine-readable medium; identifying first indeterminate sections on at least one first timeline extracted from the at least one TDT; and calculating a first indeterminacy value of the at least one TDT based on the first indeterminate sections, thereby quantifying temporal indeterminacy of the at least one TDT with the first indeterminacy value. The processor when executed can further identify second indeterminate sections on at least one second timeline extracted from the at least one temporal graph. The processor when executed can further: calculate a second indeterminacy value of the at least one temporal graph based on the second indeterminate sections; and optionally compare the first indeterminacy value to the second indeterminacy value to determine an increase in indeterminacy of the at least one TDT compared to the at least one temporal graph. The generating of the at least one TDT by transforming the at least one temporal graph can comprise storing omitted relations in an array stored on at least one of the memory and the machine-readable medium. The at least one temporal graph can comprise, for example, a Temporal Markup Language (TimeML) graph. The generating of the at least one TDT can comprise generating at least one full TDT and/or at least one abstract TDT in which a class of temporal relations has been abstracted. The at least one first timeline can be extracted from the at least one full TDT and the first indeterminacy value can be an indeterminacy value of the at least one full TDT, and the processor when executed can further: identify third indeterminate sections on at least one third timeline extracted from the at least one abstract TDT; and calculate a third indeterminacy value of the at least one abstract TDT based on the third indeterminate sections. The first indeterminacy value can be calculated by dividing an average number of the first indeterminate sections per text of the corpus by a total number of the first indeterminate sections in the corpus; the second indeterminacy value can be calculated by dividing an average number of the second indeterminate sections per text of the corpus by a total number of the second indeterminate sections in the corpus; and/or the third indeterminacy value can be calculated by dividing an average number of the third indeterminate sections per text of the corpus by a total number of the third indeterminate sections in the corpus. In addition, the processor when executed can further compare the third indeterminacy value to the second indeterminacy value to determine an increase in indeterminacy of the at least one abstract TDT compared to the at least one temporal graph.

In another embodiment, a method for providing quantifying temporal indeterminacy of a timeline can comprise: generating (e.g., by a processor in operable communication with a memory and a machine-readable medium) at least one TDT by transforming at least one temporal graph of a corpus to the at least one TDT, the at least one temporal graph being stored (e.g., on at least one of the memory and the machine-readable medium); identifying (e.g., by the processor) first indeterminate sections on at least one first timeline extracted from the at least one TDT; and calculating (e.g., by the processor) a first indeterminacy value of the at least one TDT based on the first indeterminate sections, thereby quantifying temporal indeterminacy of the at least one TDT with the first indeterminacy value. The method can further comprise identifying (e.g., by the processor) second indeterminate sections on at least one second timeline extracted from the at least one temporal graph. The method can further comprise: calculating (e.g., by the processor) a second indeterminacy value of the at least one temporal graph based on the second indeterminate sections; and comparing (e.g., by the processor) the first indeterminacy value to the second indeterminacy value to determine an increase in indeterminacy of the at least one TDT compared to the at least one temporal graph. The generating of the at least one TDT by transforming the at least one temporal graph can comprise storing omitted relations in an array stored on at least one of the memory and the machine-readable medium. The at least one temporal graph can comprise a TimeML graph. The generating of the at least one TDT can comprise generating at least one full TDT and/or at least one abstract TDT in which a class of temporal relations has been abstracted. The at least one first timeline can be extracted from the at least one full TDT and the first indeterminacy value can be an indeterminacy value of the at least one full TDT, and the method can further comprise: identifying (e.g., by the processor) third indeterminate sections on at least one third timeline extracted from the at least one abstract TDT; and calculating (e.g., by the processor) a third indeterminacy value of the at least one abstract TDT based on the third indeterminate sections. The first indeterminacy value can be calculated by dividing an average number of the first indeterminate sections per text of the corpus by a total number of the first indeterminate sections in the corpus; the second indeterminacy value can be calculated by dividing an average number of the second indeterminate sections per text of the corpus by a total number of the second indeterminate sections in the corpus; and/or the third indeterminacy value can be calculated by dividing an average number of the third indeterminate sections per text of the corpus by a total number of the third indeterminate sections in the corpus. In addition, the method can further comprise comparing (e.g., by the processor) the third indeterminacy value to the second indeterminacy value to determine an increase in indeterminacy of the at least one abstract TDT compared to the at least one temporal graph.

DETAILED DESCRIPTION

Embodiments of the subject invention provide novel and advantageous systems and methods for quantifying temporal indeterminacy of timelines (e.g., the global ordering of temporal graphs and/or Temporal Dependency Trees (TDTs)). Systems and methods can rely on solving temporal constraint problems to extract timelines. Systems and methods of embodiments of the subject invention can calculate the temporal relation loss during TDT transformation and then identify the temporal indeterminate sections of extracted timelines from both TDTs and temporal graphs to measure the total temporal information loss.

In many embodiments, at least one algorithm can be used to determine/quantify temporal indeterminacy of at least one TDT (see Algorithm 1 and Algorithm 2). First, at least one TDT can be generated by transforming at least one temporal graph to the at least one TDT. During the transformation, omitted relations can be kept in an array. Second, indeterminate sections on timelines extracted from the at least one temporal graph and the at least one TDT can be identified. The indeterminacy can be computed by, for example, dividing the average number of indeterminate sections per text (within the corpus) by the total number of indeterminate sections per corpus (the corpus or corpora being the piece(s) which were used to create the temporal graph(s)) to give an indeterminacy value. This indeterminacy value quantifies the temporal indeterminacy of the at least one TDT, and can be compared to the indeterminacy value of the at least one temporal graph if desired. Systems and methods of embodiments of the subject invention can show that TDTs can result in up to a greater than 100% (e.g., up to 109%) increase in temporal indeterminacy over the corresponding temporal graphs for the same corpus.

Deficiencies in Translingual Information Detection, Extraction, and Summarization (TIDES) led to the development of Temporal Markup Language (TimeML), another XML-based markup language for annotating temporal information, originally targeted at news articles (Sauri et al., 2006, supra.). TimeML added facilities for representing not just Allen's classic temporal relations, but also event co-reference (IDENTITY), sub-event structure (aspectual relations) and relations of conditional, hypothetical, or counterfactual nature (subordinating relations). In all there are 25 types of relations (called links) in TimeML: 14 temporal; 5 aspectual; and 6 subordinating. TimeML annotations explicitly encode a temporal graph, where the nodes are events or time expressions and edges are temporal links. As used herein, a TimeML temporal graph can be defined as follows: a TimeML temporal graph is a graph $T=(V_T, E_T)$, where $V_T=\{e_1, e_2, \ldots, e_p, t_1, t_2, \ldots t_q\}$ is a set of events $e_i$ and time expressions $t_i$, and $E_T=\{l_1, l_2, \ldots, l_r\}$ is a set of temporal links $l_i=(u, v, w)$, a tuple where $u, v \in V_T$ and $w \in L$, where L is the set of TimeML link types.

TDTs seek to identify temporal relations between events using a sequence labeling model with features from a dependency parse tree. They originally only used three temporal relations in the model: BEFORE; AFTER; and OVERLAPS. They used a Hidden Markov Model (HMM) combined with a support vector machine (SVM) as a sequence labeling model and achieved a 0.75 F1 score on correctly identifying the link type (as well as the labels NONE or VAGUE) between neighboring event and times. Several improvements were later applied to TDTs (Kolomiyets, 2012, supra.). TDTs were redefined as a tree where nodes are events and edges are temporal links, and the set of link types was expanded to six: BEFORE; AFTER; INCLUDES; IS INCLUDED; OVERLAPS; and IDENTITY. A timeline extraction method using TDTs was also proposed. This updated system was evaluated with an annotation study: two annotators created TDTs for 100 short narrative texts (fables) and then they measured inter-annotator agreement between them. Using Krippendorff's a as an agreement measure, the annotators achieved agreements of 0.86 for event recognition, 0.82 for link recognition, and 0.70 link label identification. This work generated an annotated corpus of temporal dependency trees, but this corpus has not been made public.

Another improvement to TDTs is to include time expressions in the tree structure instead of just events (Zhang, 2018, supra.). Only four relation types (BEFORE, AFTER, OVERLAPS, and INCLUDES) were used, but stative events (such as modals) were also included, and TDTs were automatically generated for a corpus that included both news and narrative genres. The reliability of this approach was evaluated by double annotation, having two annotators manually generate TDTs for 20% of their corpus, achieving F1 agreement scores of 0.97 on time expression recognition, 0.94 on event recognition, 0.86 on link recognition, and 0.79 on link label identification. A precise definition of the TDT structure was also provided, which can serve as the definition of a TDT as used herein: A temporal dependency tree (TDT) structure is defined as a 4-tuple (T, E, N, L), where T is a set of [TimeML] temporal expressions, E is a set of [TimeML] events, and N is a set of pre-defined "meta" nodes not anchored to a span of text in the document. [Elements from]

T, E, and N are the nodes in the dependency structure, and L is the set of edges in the tree, where each element in L is a temporal link.

A TDT is rooted in a ROOT node, which represents the document creation time (DCT). The children of the root are called meta-nodes, and represent time points defined relative to the DCT. Three of the meta-nodes that can be used are PAST REF, PRESENT REF, and FUTURE REF. A fourth ATEMPORAL meta-node can also be used for timeless statements. All other nodes in the TDT (descendants of the meta-nodes) represent events or times. Visualizations of a TDT are shown in FIGS. 1(b) and 1(c).

There are 14 TimeML temporal relations, which have been into four relations—BEFORE, AFTER, OVERLAPS$_{tdt}$, and INCLUDES. The tdt subscript is used to indicate that the OVERLAPS$_{tdt}$ definition (as given in Zhang, 2018, supra.) is different than Allen's. In Allen's temporal algebra, when two events $E_1$ and $E_2$ are related by an OVERLAPS relation ($E_1$ OVERLAPS $E_2$), it means the events intersect in time but neither is completely contained in the other. However, OVERLAPS$_{tdt}$ stands for a conjunction of six TimeML temporal relations—BEGINS, BEGUN BY, ENDS, ENDED BY, SIMULTANEOUS, and IDENTITY.

Figure 4:
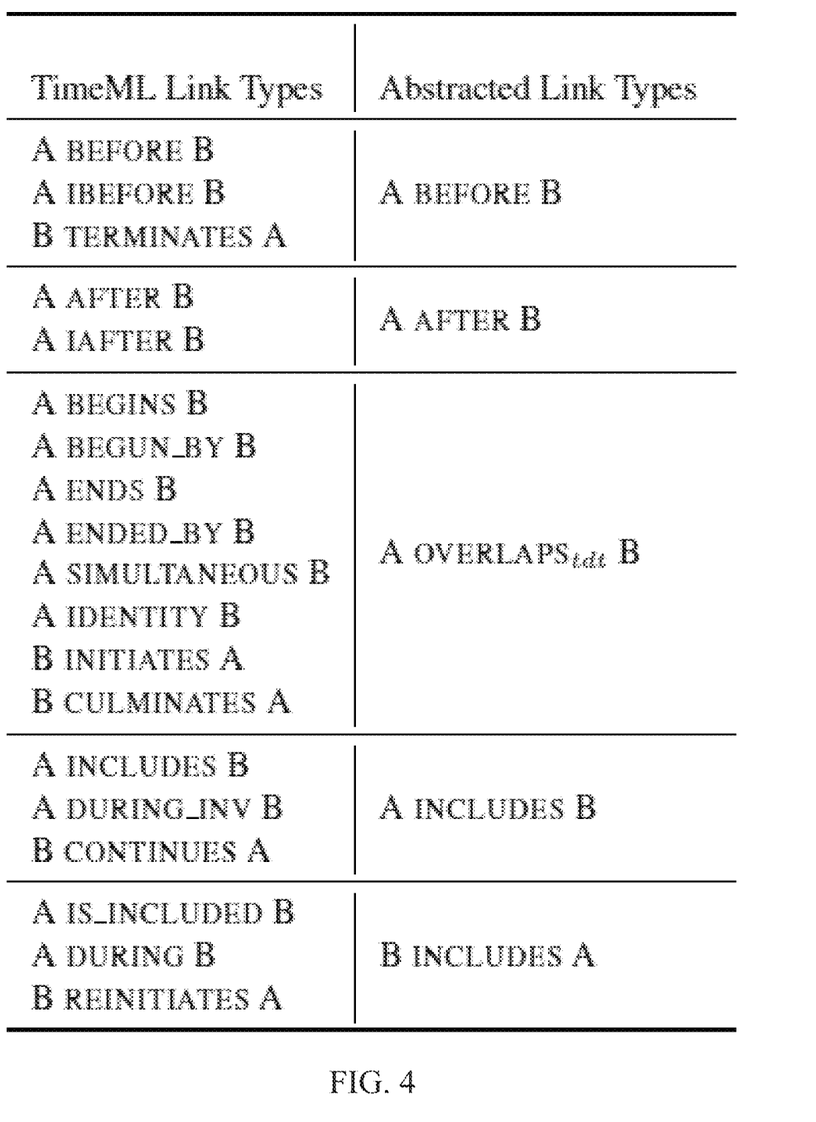
FIG. 4 shows a table of mapping of 19 TimeML temporal and aspectual link types into four abstract temporal link types.

A non-temporal DEPENDS ON link type can also be defined and used only to connect each meta-node to their children. The mapping is shown in FIG. 4, which is a table of mapping of 19 TimeML temporal and aspectual link types into four abstract temporal link types (Zhang, 2018, supra.). Because this mapping essentially abstracts the class of temporal relations, the TDTs defined in Zhang (2018, supra.) can be referred to as abstract TDTs. TDTs that use the full set of TimeML temporal and aspectual link types can be referred to as full TDTs.

Figure 5:
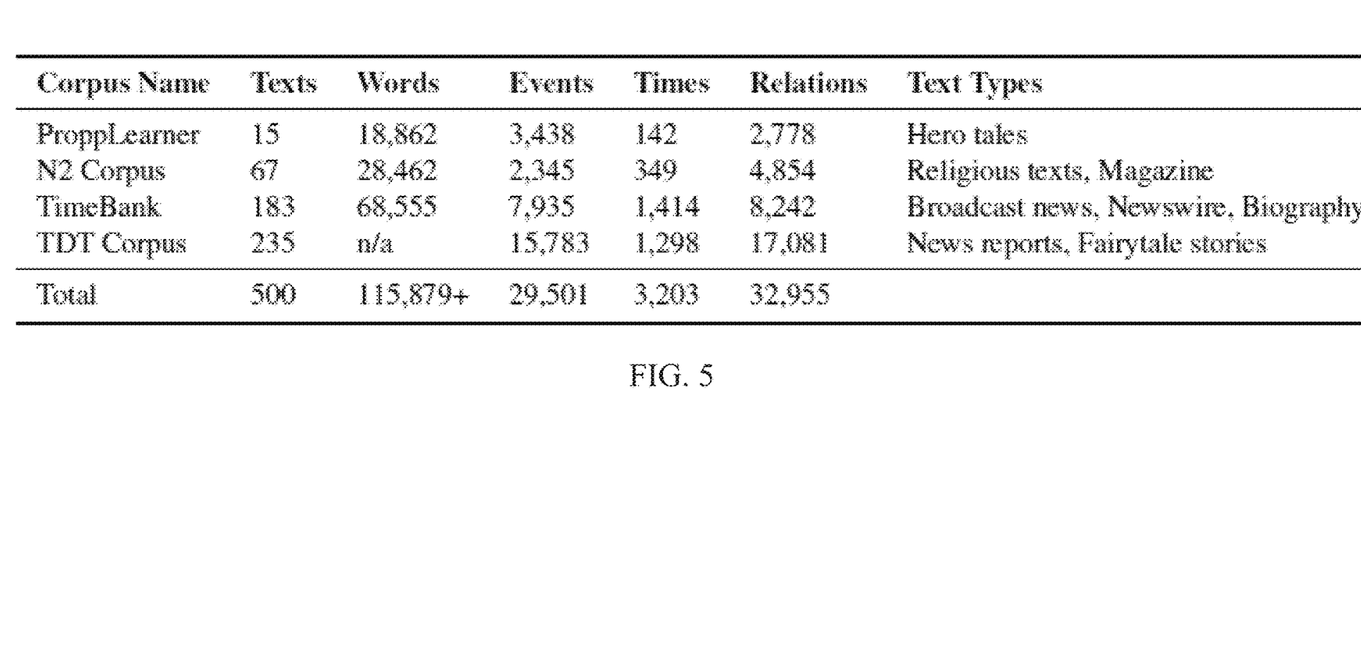
FIG. 5 shows a table summarizing four different types of corporate (ProppLearner, N2 Corpus, TimeBank, and TDT Corpus).

Any corpora can be used with systems and methods of embodiments of the subject invention. Three manually annotated TimeML corpora have been specifically used (see also the examples): TimeBank 1.2, the ProppLearner corpus, and the N2 corpus, all in the English language. TimeBank 1.2 is a collection of news stories from various sources such as Public Radio International, Voice of America, and the New York Times (Pustejovsky and Lazo et al., The TimeBank corpus, In Proceedings of Corpus Linguistics Conference, pages 647-656, Lancaster, U K, 2003). The N2 corpus contains Islamic Extremist stories including Inspire Magazine that were annotated with TimeML, among other things (Finlayson and Corman, The N2 corpus: a semantically annotated collection of islamist extremist stories. In Proceedings of the 9th International Conference on Language Resources and Evaluation (LREC'14), pages 896-902, Reykjavik, Iceland, 2014). The ProppLearner corpus was developed to enable the machine learning of Vladimir Propp's morphology of Russian folktales, containing TimeML annotations (Finlayson, Propplearner: Deeply annotating a corpus of russian folktales to enable the machine learning of a russian formalist theory. Digital Scholarship in the Humanities, 32(2):284-300, 2017). Statistical information about these three corpora is provided in FIG. 5.

TimeML corpora can be used because there is no corpus that has both TimeML temporal graphs and TDTs annotated on it. There is only one known publicly available corpus of TDTs, the TDT corpus, which is an automatically annotated collection of Chinese news reports and fairy tale stories (Zhang and Xue, The TDT Corpus, GitHub, github.com/yuchenz/structured, 2018). The TDTs in the TDT corpus were generated using an adapted dependency parser (Robaldo et al., From italian text to TimeML document via dependency parsing. In Proceedings of the 12th Computational Linguistics and Intelligent Text Processing (CICLing 2011), pages 177-187, Tokyo, Japan), but the texts do not have corresponding TimeML graphs. The TDT corpus can be used to compare the raw indeterminacy of automatically computed TDTs to the TimeML-derived TDTs presented herein.

In order to evaluate what is lost when moving from TimeML temporal graphs to TDTs, texts that have both TimeML and TDT annotations are needed. This data could be generated in several different ways. First, TimeML and TDT annotations can be automatically generated for texts using TimeML and TDT parsers. This is problematic because of the great deal of noise introduced by even state-of-the-art TimeML and TDT parsers, which then obscures what deficiencies are a result of the TDT representation as opposed to parser performance. Second, a dataset that has gold standard annotations of TimeML and TDTs can be used; unfortunately, no such datasets are known to exist. There are numerous corpora with gold-standard TimeML annotations, but no manually annotated, publicly available TDT corpus that also has TimeML annotations is known. One corpus (the TDT corpus) has automatically generated TDT annotations, but no TimeML. A third option is to generate TDTs programmatically from gold-standard TimeML annotated texts. This approach guarantees that both gold-standard TimeML annotations and the best possible TDT for every text will be present, so that they can be directly compared.

Because TDTs are being automatically generating from TimeML graphs, and not generated using a TDT parser, there is a question as to whether the TDTs are faithful to the original TDT scheme. Below is a brief description of how TDT parsers work, so that it can be seen that the generation algorithm (Algorithm 1) intuitively follows the automatic TDT parsing and thus produces a "best possible" TDT.

A TDT parser starts by initializing a TDT with a ROOT node that represents the document creation time (DCT), and which has four children (the meta-nodes): PAST REF; PRESENT REF; FUTURE REF; and ATEMPORAL (Zhang and Xue, 2018, supra.). The parser then proceeds through the text in reading order. Every time the TDT parser detects a new event or time expression, it attempts to find a relationship between that event or time and an existing node in the TDT in a breadth-first manner. If a relationship (link) is found to an existing node (by running a link classifier, e.g., an SVM), the new event or time is added as a child to that node, with the appropriate link type, and removed from further consideration. If no relationship is found, it is set aside and checked for a relationship with each new node that is later added to the tree. If, at the end of the text, there are still nodes that have no relationships to any other nodes in the tree, they are added as children of the ATEMPORAL meta-node.

To illustrate the TDT structure, below is a snippet from the TimeBank 1.2 text APW19980213.1320.tml (Pustejovsky and Lazo et al., 2003, supra.), which will be referred to herein as "the TimeBank 1.2 snippet". In this snippet, underlined text refers to a marked TimeML event or temporal expression, and is labeled with its id (e.g., $e_1$ or $t_{44}$) from the annotation. To enhance understandability, only show events and times related to the FUTURE REF meta-node are shown, which corresponds to one top-level branch of the resulting TDT.

DCT: 1998-02-13$_{t_{41}}$

Qantas will almost double$_{e_1}$ its flights between Australia and India by August$_{t_{43}}$ in the search for new markets untouched the crippling Asian financial crisis. This move$_{e_{28}}$ comes barely a month$_{t_{44}}$ after Qantas suspended$_{e_5}$ a number of services$_{e_{28}}$ between Australia, Indonesia, Thailand and Malaysia in the wake of the Asian economic crisis$_{e_{20}}$. The airline has also cut$_e$ all flights$_{e_{11}}$ to South Korea.

Figure 1A:
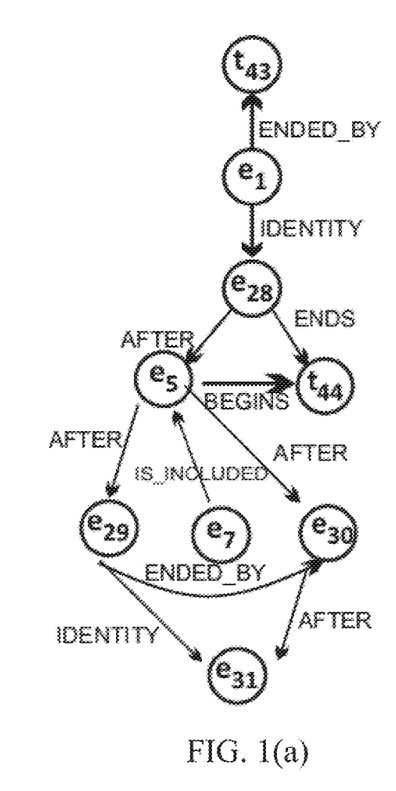
FIG. 1(a) shows a full Temporal Markup Language (TimeML) temporal graph for an example snippet of a corpus.
Figure 1B:
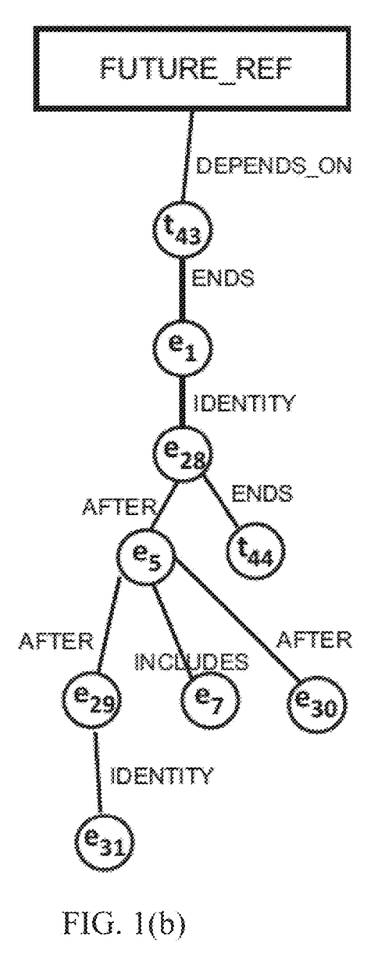
FIG. 1(b) shows a full Temporal Dependency Tree (TDT) for the example snippet represented in FIG. 1(a).
Figure 1C:
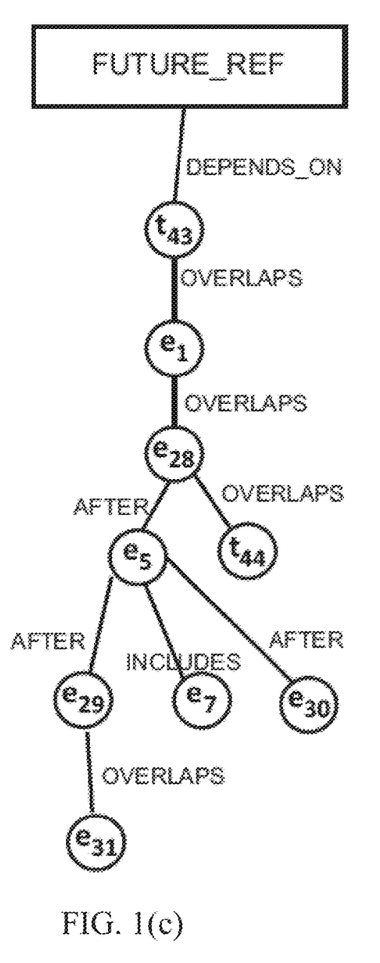
FIG. 1(c) shows an abstract TDT for the example snippet represented in FIG. 1(a).

The temporal graph for the TimeBank 1.2 snippet is shown in FIG. 1(a). A TDT can be generated from this temporal graph by following the TDT definition and procedure. During the process, two types of TDTs can be generated: first, TDTs that use the full set of TimeML temporal and aspectual links (full TDTs); then the abstraction mappings shown in in FIG. 4 can be applied to produce abstract TDTs.

The algorithm for generating full TDTs from TimeML graphs is shown in Algorithm 1. It follows the TDT parsing procedure almost exactly, but rather than using a classifier to determine whether there is a relationship between a new node and the TDT, it queries the TimeML graph. First, a first-in first-out (FIFO) queue can be initialized with all events and times in the TimeML graph such that they will be returned in text order (line 2). An empty TDT can then be initialized with a ROOT node and all four meta-nodes can be added to the tree as children of the root (lines 3-7). Events or times can then be popped from the queue (call this event or time n; lines 8-20), first looking through the tree in a breadth-first manner for an event or time to which n is linked (line 11). The presence of a link is determined by querying the TimeML graph. It should be noted that in a consistent TimeML graph no two nodes will be connected by more than one temporal or aspectual link. If n is not found to link to an existing node (line 12), then n is added to the unlinked set for future processing (line 13). If n is found to link to existing node, it is added as a child to that node (line 15) and all unlinked nodes are checked for relationships to the new node (lines 16-20). Any events or times that remain unrelated to any other nodes at end of the text are added as children to the ATEMPORAL meta-node (line 21).

When this procedure is applied to the example temporal graph in FIG. 1(a), it produces the full TDT shown in FIG. 1(b). As can be seen 3 of the original 11 links in the TimeML graph are omitted in the TDT. One of the questions is how much temporal information is lost in this process, which can be measured directly with systems and methods of embodiments of the subject invention.

As mentioned above, during the transforming events and times can be iterated in text order. Other orders can also be considered to determine if the order of iteration matters. While different specific links can be omitted for different orders (e.g., reverse text order, or random), it resulted in the same average loss of temporal information. The main reason for this is that to transform a graph into a tree, the algorithm must ultimately remove one edge from every cycle. After generating full TDTs, abstract TDTs were generated by applying the mappings shown in FIG. 4. FIG. 1(c) shows the abstract TDT for the TimeBank 1.2 snippet.

Algorithm 1 Generating a Full TDT

```
1:  procedure GENERATEFULLTDT(G)
Require: G                              ▷ TimeML graph
Require: N                              ▷ FIFO queue
Require: U        ▷ set of as-yet unlinked events and times
2:      N.pushAll(G.V)     ▷ Add all events and times in text
                                                        order
3:      T → ROOT          ▷ initialize TDT with the ROOT node
4:      T.ROOT.addChild(PAST_REF)           ▷ add meta-nodes
5:      T.ROOT.addChild(PRESENT_REF)
6:      T.ROOT.addChild(FUTURE_REF)
7:      T.ROOT.addChild(ATEMPORAL)
8:      while !N.isEmpty( ) do
9:          n ← N.pop( )
10:         for all v ∈ T_v do      ▷ iterate over tree breadth-first
11:             l ← GETLINK(G, n, v)      ▷ identify link, if any
12:             if l = θ then
13:                 U.add(n)
14:             else
15:                 v.addChildWithLink(n, l)
16:                 for all u ∈ U do     ▷ check all as-yet unlinked
17:                     l ← GETLINK(G, n, u)
18:                     if l ≠ θ then
19:                         n.addChildWithLink(u, l)
20:                         U.remove(u)
21:         ATEMPORAL.addChildren(U)
22:      return T
```

Figure 6:
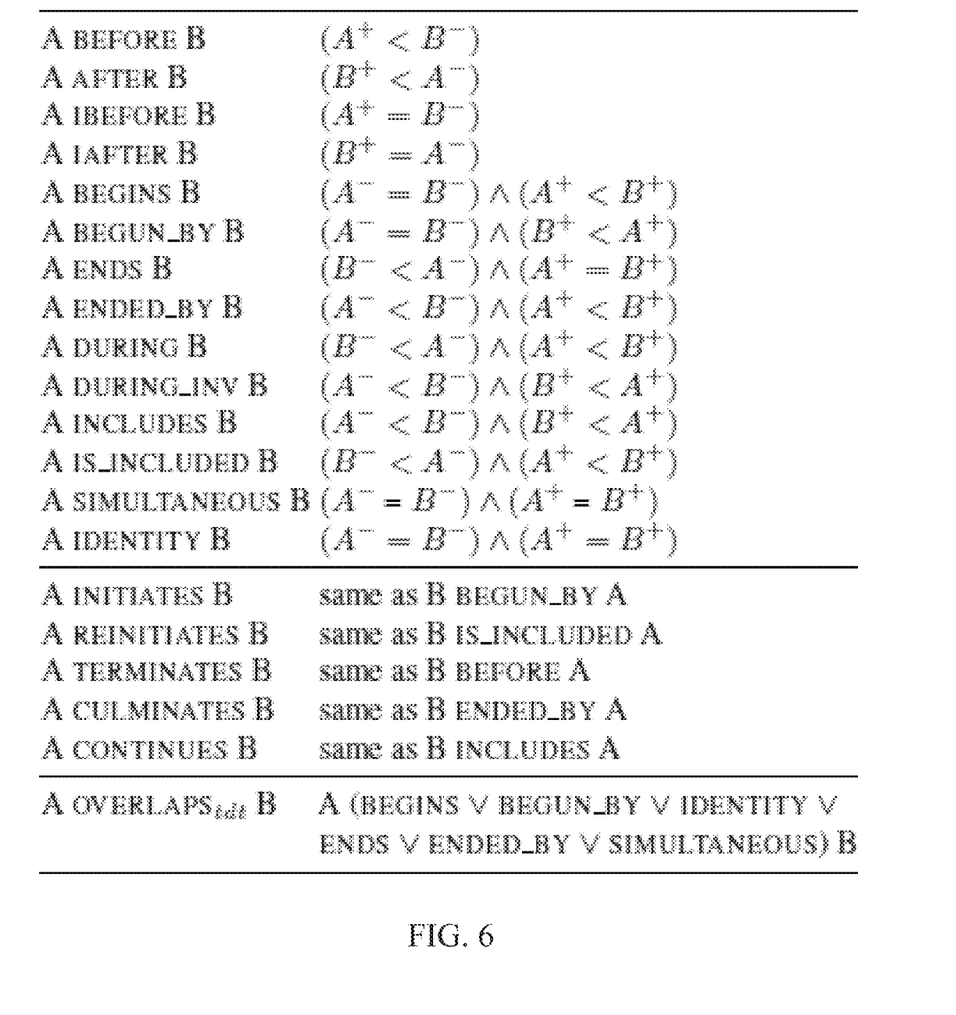
FIG. 6 shows a table representing translation of TimeML temporal and aspectual links into primitive temporal relations between interval start and end points. For an interval I (an event or a time) the start point of the interval is denoted by I and the end point is denoted by $I^+$.

The information lost in moving from TimeML graphs to TDTs can be precisely compared by converting both the TimeML graphs and TDTs into a uniform representation, namely, timelines. To extract a timeline, the TimeML or TDT can first be translated into a temporal constraint graph using primitive temporal relations, and then the graph can be solved. This translation is made by substituting each individual event or time interval I by its corresponding pairs of start and end time points $I^-$ and $I^+$, and replacing each link between intervals with conjunctions of primitive temporal constraints (either < or =) between time points as shown in FIG. 6. In addition to the replacements in the table of FIG. 6, for each interval I the constraint that its starting point $I^-$ must be less than its ending point $I^+$ was also included. A solution to the temporal constraint problem can then be defined as follows: a temporal constraint problem P=(T, C) where T={$t_1, t_2, \ldots$} is a set of time points, and C={$c_1, c_2, \ldots$} is a set of temporal constraints between intervals, is consistent or solvable if and only if a vector of integers ($i_1, i_2, \ldots$) is a solution ($t_1=i_1, t_2=i_2, \ldots$) of the temporal graph that satisfies all the constraints.

This means that if integers can be assigned to the time points such that all temporal constraints are satisfied, then the temporal structure (TimeML temporal graphs, full TDT, abstract TDT, etc.) is consistent and solvable.

In order to find a solution the off-the-shelf Java Constraint Programming (JaCoP) solver can be used (Kuchcinski et al., JaCoP: Java constraint programming solver, 2013, jacop.cs.lth.se). JaCoP is an open source library that offers a rich set of constraint types as well as configurable solution search methods. The JaCoP setting that finds the smallest solution can be used, which assures that any differences in the length of timelines are the result of temporal information content, and not choice of solution. If JaCoP is able to find a solution then it means the temporal structure is consistent; otherwise it is inconsistent. This method was applied to the TimeML temporal graphs, full TDTs, and abstract TDTs for the TimeBank corpus, the N2 corpus, and ProppLearner corpus, as well as to the abstract TDTs automatically parsed.

If the TimeML graphs are inconsistent this meant there was an error in the manual annotation; these graphs were corrected by hand using the original text as reference. There were 9, 10, and 18 inconsistent texts in the ProppLearner, N2 Corpus, and TimeBank corpus respectively. Because the TDT Corpus is in Chinese, these annotations were not corrected and inconsistent TDT annotations were discarded instead. Out of 235 TDT corpus texts, 25 were inconsistent and discarded.

Figures 2A, 2B:
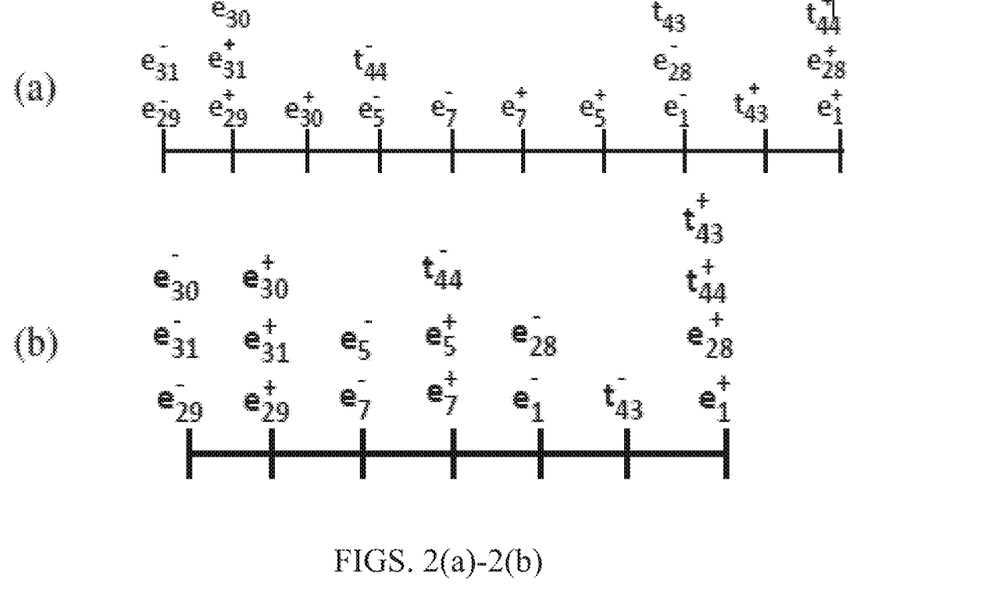
FIG. 2(a) shows a timeline for a TimeML graph.
FIG. 2(b) shows a timeline for a full TDT and abstract TDT.

Once integer assignments to time points are obtained for the TimeML graph or TDT, these integers can be sorted to obtain the corresponding timeline. Because the same integer might be assigned to different time points, the length of timelines can be measured in two ways: the number of time points, which is directly proportional to the number of events and times; or the number of time steps, which is the number of integers in the solution to the temporal constraint problem. For instance, the timelines extracted from the TimeML graph, full TDT, and abstract TDT for the Time-Bank 1.2 snippet are shown in FIGS. 2(a) and 2(b), with FIG. 2(a) showing the timeline for the TimeML graph and FIG. 2(b) showing the timeline for the full and abstract TDT. The timeline for the TimeML graph has 10 time steps and 18 time points. In this example, the TimeML and TDT timelines both have the same number of time points, but the number of time steps in the TDT case is smaller on account of discarded temporal information. In the general case, because TimeML graphs encode subordinating relations that are completely disregarded by TDTs, certain events and times might be removed from the TDT timeline altogether, and so the number of time points in TDT timelines can be smaller than in the equivalent TimeML timeline.

The information loss between timelines can be compared by computing the indeterminacy of time point orderings relative to the original temporal graph or tree. Temporal graphs or trees often do not have enough information to identify a unique timeline. Sections of the timeline that have multiple possible solutions can be referred to as indeterminate. Similarly, time points or time steps involved in these sections can also be referred to as indeterminate.

Figures 3A, 3B:
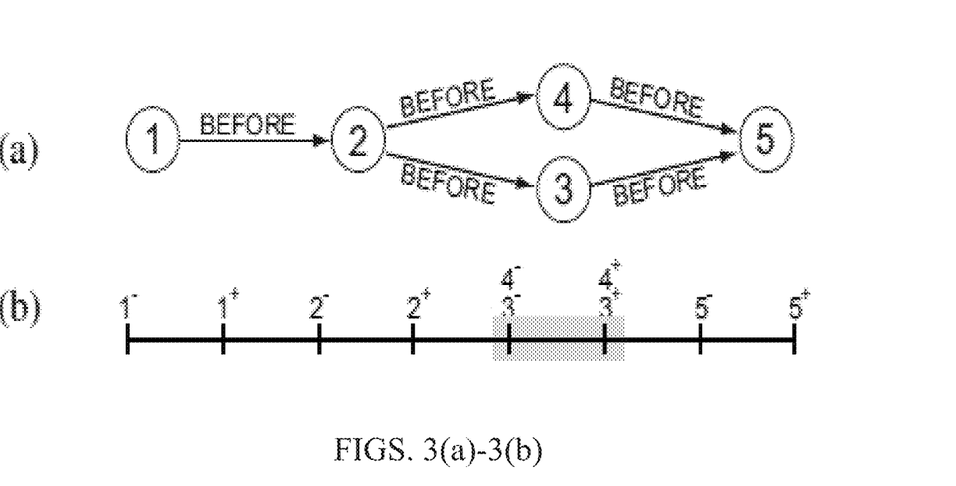
FIG. 3(a) shows an indeterminate temporal graph; the relative order of 3 and 4 is indeterminate.
FIG. 3(b) shows a minimal timeline solution for the indeterminate temporal graph of FIG. 3(a), with the indeterminate section marked in gray; the relative order of 3 and 4 is indeterminate.

A simple example of a temporally indeterminate TimeML graph is shown in FIG. 3(a), with its corresponding minimal timeline solution showing in FIG. 3(b) (the indeterminate section is marked in gray in FIG. 3(b)). For this temporal graph, the uniquely determined orderings include the first and last sections of the timeline, namely $1^-<1^+<2^-<2^+<3$, 4 and 3, $4<5^-<5^+$. On the other hand, the order of 3 and 4 is indeterminate. There are 11 possible solutions for the ordering of the start and end points of these two intervals.

---

Algorithm 2 Identifying Indeterminacies

```
1:    procedure FINDINDETERMINATESECTIONS(s, T)
Require: s                              ▷ shortest timeline
Require: T                              ▷ all other timelines
2:        d ← θ              ▷ map of time point pairs to boolean
3:        for all p ← (t_i, t_{i+1}) do ∈ s do  ▷ neighboring time points
4:            d(p) ← false
5:            for all t ∈ T do          ▷ for all other timelines
6:                if p ⊄ t then         ▷ if the pair are not neighbors
7:                    d(p) ← true       ▷ mark the pair indeterminant
8:        return d
```

---

An algorithm for identifying indeterminacies is shown in Algorithm 2. The algorithm works by comparing all possible timelines, which the JaCoP solver can provide. The algorithm iterates through all adjacent time point pairs in the shortest timeline (lines 3-7), and checks to see if these two points are adjacent in all other timelines (lines 5-6). If they are not, the order of that pair is marked indeterminate (line 7). In practice, it often takes considerable time to compute all possible timelines. In some embodiments, to save time, a limit can be set (e.g., 100 random alternative timelines), which gives a lower-bound to the indeterminacy. With these results, it can be visualized which portions of the shortest timeline are indeterminate, as illustrated in FIGS. 3(a) and 3(b). The temporal indeterminacy of the TimeML graphs can thus be measured for the three TimeML corpora, and the TDTs for all four corpora. The amount of indeterminacy can be measured in a number of ways: the number of indeterminate time points or time steps can be counted; the number of indeterminate sections can be counted; or the fraction of time steps or time points that are indeterminate can be counted. Detailed results are presented in FIG. 9.

In many embodiments, a system or method can be implemented via software code. In an embodiment, the code can be written in Java, for example building upon the JaCoP constraint solving tool as mentioned above, and taking as input TimeML (.tml), Story Workbench (.sty), or TDT (.tdt) files. The constraint satisfaction problem is in theory NP-complete, though the experiments in the example took no longer than a second on a current, standard consumer laptop (2.4 GHz 4-core Intel i7 3630QM with 8 GB of RAM).

Systems and methods of embodiments of the subject invention can use two algorithms. First, full TDTs and/or abstract TDTs can be generated by transforming temporal graphs (e.g., TimeML temporal graphs) to TDTs. During the transformation, omitted relations can be kept in an array. Second, indeterminate sections on timelines extracted from the temporal graphs, full TDTs, and/or abstract TDTs can be identified. Use of these two algorithms on four different corpora is discussed herein (see also FIG. 5-9 and Examples 1 and 2).

Systems and methods of embodiments of the subject invention can be used to measure temporal information loss of TDTs. An algorithm can be used to identify indeterminate sections of timelines; indeterminate sections indicate the fuzziness of timelines. In the indeterminate sections, total order cannot be extracted, so identifying indeterminate sections shows the temporal information lacking in documents. Therefore, embodiments can be used to quantify the quality of timelines/storylines (e.g., TDTs of timelines/storylines).

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Example 1—Omitted Temporal Relations

Figure 7:
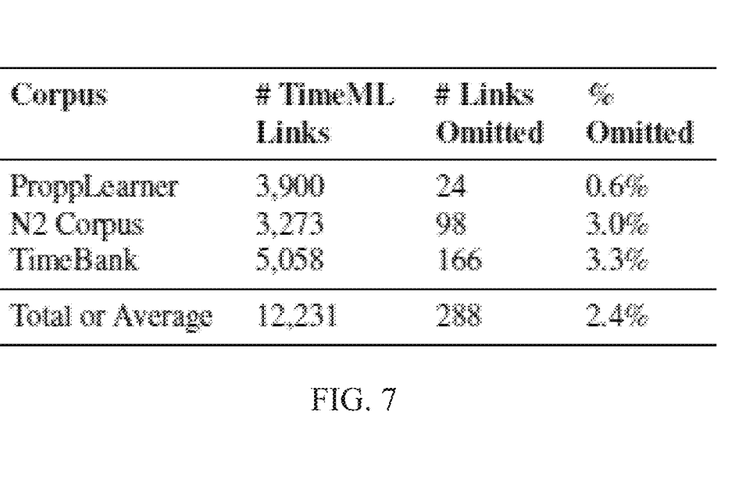
FIG. 7 shows a table of counts of temporal relations present in TimeML graphs and omitted in TDTs.

Using Algorithm 1 the TimeML graphs were transformed from the 265 texts (including corrected texts) in the TimeBank, N2, and ProppLearner corpora into full TDTs. The overall counts of TimeML relations and omitted links is shown in FIG. 7, and on average 2.4% of temporal relations were omitted. The two reasons for these omissions were: (1) tree nodes may only have one parent; and (2) the TDT representation ignores subordinating links. This observation emphasizes that in the general case TDTs cannot represent all of the temporal information in a text.

Example 2—Increase in Indeterminacy

Figure 8:
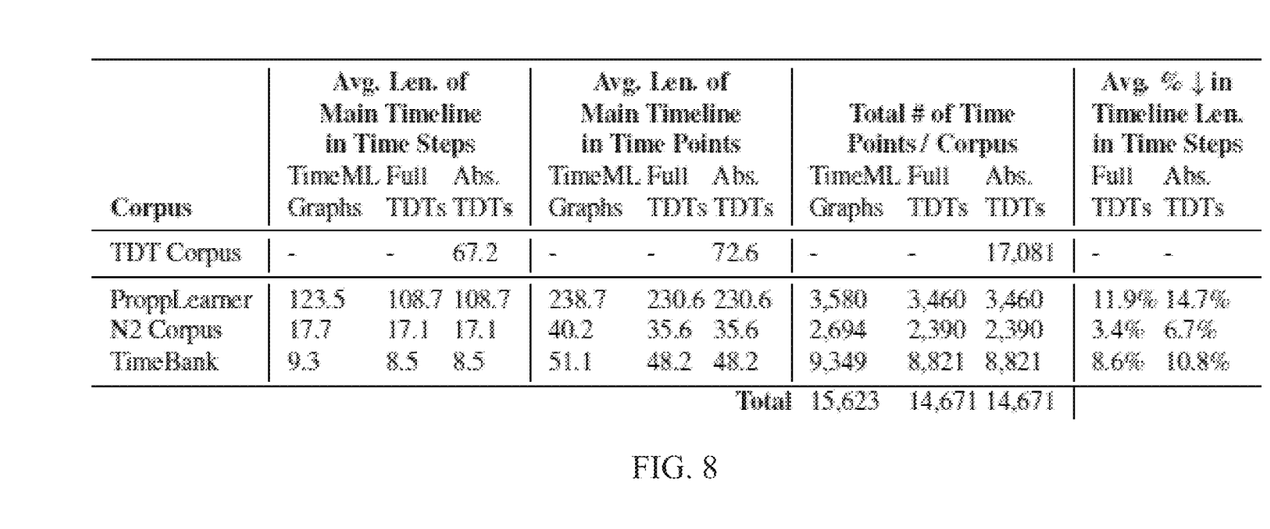
FIG. 8 shows a table of characteristics of timelines extracted from corrected corpora. The TDT corpus is included for comparison only and includes only abstract TDTs, with inconsistent TDTs excluded (25 texts).

After extracting full TDTs from the corpora abstract TDTs were generated as described herein, and extracted timelines were generated from the TimeML graphs, full TDTs, and abstract TDTs. FIG. 8 shows various characteristics of the timelines so extracted, including their average length in terms of both time steps and time points (first and second groups of columns), total number of time points (third group), and average percentage decrease of TDT timeline lengths relative to TimeML timelines in terms of time steps (last group). In the last column group, it can be seen that overall timeline lengths in full and abstract TDTs decreased by anywhere from 3.4% to 14.7% on average.

Figure 9:
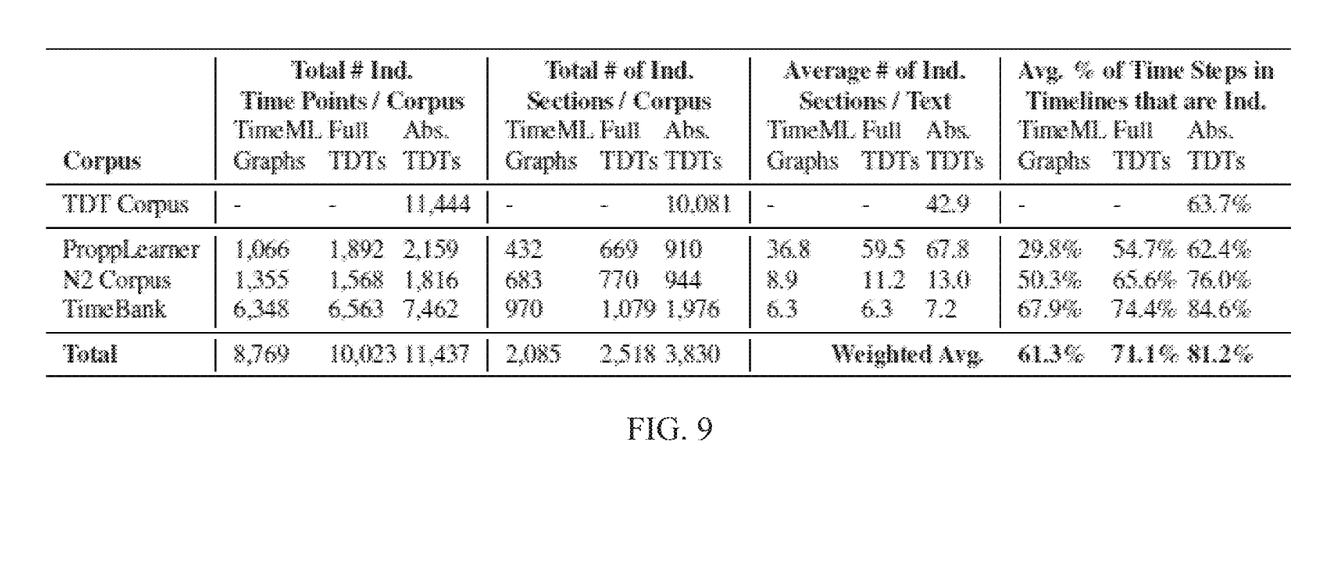
FIG. 9 shows a table of indeterminacy in timelines extracted from TimeML graphs versus that in TDTs. The TDT corpus is included for comparison only and includes only abstract TDTs, with inconsistent TDTs excluded (25 texts). Sections are defined as unbroken sequences of indeterminate time points or steps. The weighted average was computed by weighting with time points.

Algorithm 2 was applied to these timelines to identify indeterminate sections and time points; FIG. 9 shows the results. The relative indeterminacy of timelines can be compared by computing the percentage of time steps that are assigned an indeterminate time point (last group of columns). Transformation of TimeML graphs into a full TDT increased the temporal indeterminacy by 76%, 16%, and 22% (average 22%) for the ProppLearner, N2, and TimeBank corpora, respectively. These fractions were computed by dividing the numbers in the second-to-last column (average number of indeterminate sections per text) of FIG. 9 by those in the third-to-last column (total number of indeterminate sections per corpus). Similarly, transformation of TimeML graphs into abstract TDTs increased indeterminacy by 109%, 51%, and 25% (average 32%) for the ProppLearner, N2, and TimeBank corpora, respectively. Overall, 11,437 out of 14,671 (78%) time points were indeterminate for abstract TDT timelines and 10,023 out of 14,671 (70%) were indeterminate for full TDT timelines, compared with 8,769 out of 15,623 (56%) for TimeML timelines. Thus, even full TDTs increased temporal indeterminacy significantly compared to TimeML graphs. In contrast to time points, on average 52.2% of time steps in TimeML timelines were indeterminate, compared with 67.2% and 78.1% of time steps in full TDT and abstract TDT timelines, respectively. This increase in indeterminacy is potentially important to downstream natural language processing (NLP) stages. For example, for a question answering system that is addressing temporal or causal questions, the text may provide enough information to produce a single answer, but a TDT representation may not include all of that information, making it impossible for the QA system to answer unambiguously.

On average, the increase in indeterminacy was 32%, and this increase was a result of the TDT representation eliminating on average only 2.4% of total temporal relations. This result suggests that small differences can have big effects in temporal graphs, and the use of TDTs must be balanced against their deficiencies, with tasks requiring an accurate global temporal ordering potentially calling for use of the full temporal graph.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for quantifying temporal indeterminacy of a timeline of a corpus, the system comprising:
   a processor;
   a memory in operable communication with the processor; and
   a machine-readable medium in operable communication with the processor and the memory, the machine-readable medium having instructions stored thereon that, when executed by the processor, perform the following steps:
   generating at least one full Temporal Dependency Tree (TDT) and at least one abstract TDT by transforming at least one temporal graph of the corpus to the at least one full TDT and the at least one abstract TDT, the at least one temporal graph being stored on at least one of the memory and the machine-readable medium, each abstract TDT of the at least one abstract TDT comprising a class of temporal relations that has been abstracted, the at least one full TDT being generated using all temporal and aspectual link types of the at least one temporal graph, and the at least one abstract TDT being generated using only a subset of the temporal and aspectual link types of the at least one temporal graph;
   identifying first indeterminate sections on at least one first timeline extracted from the at least one full TDT;
   identifying second indeterminate sections on at least one second timeline extracted from the at least one temporal graph;
   identifying third indeterminate sections on at least one third timeline extracted from the at least one abstract TDT;
   calculating a first indeterminacy value of the at least one full TDT based on the first indeterminate sections, thereby quantifying temporal indeterminacy of the at least one full TDT with the first indeterminacy value
   calculating a second indeterminacy value of the at least one temporal graph based on the second indeterminate sections; and
   calculating a third indeterminacy value of the at least one abstract TDT based on the third indeterminate sections, thereby quantifying temporal indeterminacy of the at least one abstract TDT with the third indeterminacy value, the at least one temporal graph comprising a Temporal Markup Language (TimeML) graph, and the quantifying of the temporal indeterminacy of the at least one full TDT and the at least one abstract TDT thereby improving the ability of the system to quantify a quality of the timeline of the corpus.

2. The system according to claim 1, the processor when executed further:

comparing the first indeterminacy value to the second indeterminacy value to determine an increase in indeterminacy of the at least one full TDT compared to the at least one temporal graph.

3. The system according to claim 1, the generating of the at least one full TDT and the at least one abstract TDT by transforming the at least one temporal graph comprising storing omitted relations in an array stored on at least one of the memory and the machine-readable medium.

4. The system according to claim 1, the first indeterminacy value being calculated by dividing an average number of the first indeterminate sections per text of the corpus by a total number of the first indeterminate sections in the corpus.

5. A method for quantifying temporal indeterminacy of a timeline of a corpus, the method comprising:

generating, by a processor in operable communication with a memory and a machine-readable medium of a system, at least one full Temporal Dependency Tree (TDT) and at least one abstract TDT by transforming at least one temporal graph of the corpus to the at least one full TDT and the at least one abstract TDT, the at least one temporal graph being stored on at least one of the memory and the machine-readable medium, each abstract TDT of the at least one abstract TDT comprising a class of temporal relations that has been abstracted, the at least one full TDT being generated using all temporal and aspectual link types of the at least one temporal graph, and the at least one abstract TDT being generated using only a subset of the temporal and aspectual link types of the at least one temporal graph;

identifying, by the processor, first indeterminate sections on at least one first timeline extracted from the at least one full TDT;

identifying, by the processor, second indeterminate sections on at least one second timeline extracted from the at least one temporal graph;

identifying, by the processor, third indeterminate sections on at least one third timeline extracted from the at least one abstract TDT;

calculating, by the processor, a first indeterminacy value of the at least one full TDT based on the first indeterminate sections, thereby quantifying temporal indeterminacy of the at least one full TDT with the first indeterminacy value;

calculating, by the processor, a second indeterminacy value of the at least one temporal graph based on the second indeterminate sections; and calculating, by the processor, a third indeterminacy value of the at least one abstract TDT based on the third indeterminate sections, thereby quantifying temporal indeterminacy of the at least one abstract TDT with the third indeterminacy value, the at least one temporal graph comprising a Temporal Markup Language (TimeML) graph, and the quantifying of the temporal indeterminacy of the at least one full TDT and the at least one abstract TDT thereby improving the ability of the system to quantify a quality of the timeline of the corpus.

6. The method according to claim 5, further comprising:

comparing, by the processor, the first indeterminacy value to the second indeterminacy value to determine an increase in indeterminacy of the at least one full TDT compared to the at least one temporal graph.

7. The method according to claim 5, the generating of the at least one full TDT and the at least one abstract TDT by transforming the at least one temporal graph comprising storing omitted relations in an array stored on at least one of the memory and the machine-readable medium.

8. The method according to claim 5, the first indeterminacy value being calculated by dividing an average number of the first indeterminate sections per text of the corpus by a total number of the first indeterminate sections in the corpus.

9. A system for quantifying temporal indeterminacy of a timeline of a corpus, the system comprising:

a processor;

a memory in operable communication with the processor; and a machine-readable medium in operable communication with the processor and the memory, the machine-readable medium having instructions stored thereon that, when executed by the processor, perform the following steps:

generating at least one full Temporal Dependency Tree (TDT) and at least one abstract TDT by transforming at least one temporal graph of the corpus to the at least one full TDT and the at least one abstract TDT, the at least one temporal graph being stored on at least one of the memory and the machine-readable medium, each abstract TDT of the at least one abstract TDT comprising a class of temporal relations that has been abstracted, the at least one full TDT being generated using all temporal and aspectual link types of the at least one temporal graph, and the at least one abstract TDT being generated using only a subset of the temporal and aspectual link types of the at least one temporal graph;

identifying first indeterminate sections on at least one first timeline extracted from the at least one full TDT;

identifying second indeterminate sections on at least one second timeline extracted from the at least one temporal graph;

identifying third indeterminate sections on at least one third timeline extracted from the at least one abstract TDT;

calculating a first indeterminacy value of the at least one full TDT based on the first indeterminate sections, thereby quantifying temporal indeterminacy of the at least one full TDT with the first indeterminacy value;

calculating a second indeterminacy value of the at least one temporal graph based on the second indeterminate sections;

calculating a third indeterminacy value of the at least one abstract TDT based on the third indeterminate sections, thereby quantifying temporal indeterminacy of the at least one abstract TDT with the third indeterminacy value;

comparing the first indeterminacy value to the second indeterminacy value to determine an increase in indeterminacy of the at least one full TDT compared to the at least one temporal graph; and comparing the third indeterminacy value to the second indeterminacy value to determine an increase in indeterminacy of the at least one abstract TDT compared to the at least one temporal graph, the generating of the at least one full TDT and the at least one abstract TDT by transforming the at least one temporal graph comprising storing omitted relations in an array stored on at least one of the memory and the machine-readable medium, the at least one temporal graph comprising a Temporal Markup Language (TimeML) graph, the first indeterminacy value being calculated by dividing an average number of the first indeterminate sections per text of the corpus by a total number of the first indeterminate sections in the corpus, the second indeterminacy value being calculated by dividing an average number of the second indeterminate sections per text of the corpus by a total number of the second indeterminate sections in the corpus, the third indeterminacy value being calculated by dividing an average number of the third indeterminate sections per text of the corpus by a total number of the third indeterminate sections in the corpus, and the quantifying of the temporal indeterminacy of the at least one full TDT and the at least one abstract TDT thereby improving the ability of the system to quantify a quality of the timeline of the corpus.

\* \* \* \* \*